3,248,282
STABILIZATION OF BIS(PENTACHLORO-2,4-CYCLOPENTADIEN-1-YL)
Sheldon B. Greenbaum, Tonawanda, and Edward D. Weil, Lewiston, N.Y., assignors to Hooker Chemical Corporation, Niagara Falls, N.Y., a corporation of New York
No Drawing. Filed May 20, 1963, Ser. No. 281,800
6 Claims. (Cl. 167—30)

This invention relates to compositions stabilized against decomposition by light. More specifically, the present invention is concerned with a process for the stabilization of pesticidal composition such as bis(pentachloro-2,4-cyclopentadien-1-yl) against decomposition by light.

The chlorocarbon bis(pentachloro-2,4-cyclopentadien-1-yl) (also named decachlorobi-2,4-cyclopentadien-1-yl) has found considerable utility, particularly as a pesticide, especially as a miticide for use in greenhouses. It has given outstanding control of mites under greenhouse conditions. However, under outdoor conditions, its performance has been less satisfactory in areas of high sunlight intensity. That the cause of this deficiency is photochemical breakdown has been proven by laboratory experiments under artificial light, wherein it is found that bis(pentachloro-2,4-cyclopentadien-1-yl) breaks down under irradiation by actinic light at such a rate that a major proportion of the original toxicant can be decomposed in one week. Various conventional stabilizers, screening agents and pigments have been incorporated without success in an attempt to retard this photochemical breakdown.

According to the present invention bis(pentachloro-2,4-cyclopentadien-1-yl) is stabilized against photo decomposition by adding to it a stabilizing amount of at least one compound selected from the group consisting of diphenylamine and phenothiazine. These two compounds may be represented by the generic formula

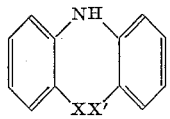

where X and X' represent hydrogen or jointly represent a sulfide bridge linking the two benzene rings.

The percentage of the stabilizing compound to be utilized will vary depending on the degree of stabilization desired and the degree of sunlight exposure to be anticipated. However, in general the stabilizing compound is to be employed at 0.1 to 25 percent of the weight of the bis(pentachloro-2,4-cyclopentadien-1-yl) toxicant. The bis(pentachloro-2,4-cyclopentadien-1-yl), itself, may be from about 0.5 to about 99 percent of the pesticidal composition and is usually from 1 to 90 percent thereof. It is to be appreciated that lesser and greater amounts of such stabilizing compound may be utilized in some applications in the practice of the invention.

The stabilized compositions of the invention may be in the form of liquids, wettable powders, or dusts. The preferred forms, because of their greater compatibility with other pesticides and their greater freedom from phytotoxicity, are the wettable powders and dusts.

The invented compositions may contain any of the usual formulation adjuvants, e.g., carriers, surface active agents, dispersing agents, sticking agents, blending agents, solvents, colorants, and the like. Suitable carriers include, for example, clays, silica, talc, calcium carbonate, wood flour, synthetic silicates, and the like. Suitable surfactants include, for example, anionic wetting agents of the alkylarylsulfonate and alkylsulfonate types, non-ionic surfactants of the polyoxyethylene ether type, and in general any suitable surfactant such as those listed by McCutcheon, "Detergents and Emulsifiers," published by the author, Morristown, N.J. (1962).

Dispersing agents include ligninsulfonates and other organic and inorganic polyanionic substances. Sticking and blending agents include oily and gummy substances to aid the ingredients of the formulation in blending and cohering to one another, promoting intimate mixture of the toxicant and stabilizer, as well as aiding the toxicant and stabilizer to adhere to the site of the desired pesticidal action. Such agents include long chain fatty acids, vegetable oils, polybutenes, low molecular weight polyethylene, natural gums, and the like.

While both phenothiazine and diphenylamine have had application as insecticides, the level at which they are employed as in the present formulations is generally below that at which they would exert appreciable insecticidal action, and their role in the formulations of the invention is not that of insecticides but of stabilizers and photo-decomposition retardants. Data are presented herein to demonstrate their stabilizing ability under laboratory conditions of photochemical decomposition.

It is to be understood that the mode of the stabilizing action of these compounds is not known and this invention is not limited to a particular mode or theory. Some of the stabilizing action may be caused by photochemical reaction products of the phenothiazine and diphenylamine. Encompassed within the scope of our invention are compositions containing phenothiazine and/or diphenylamine which have already been affected by photochemical action as well as the fresh compositions in which no such photochemical action has yet occurred.

The employment of the stabilizers of the invention does not preclude the use of further screening agents or stabilizers to complement or supplement their action. Such additional agents may include, for example, carbon black or nigrosine (a common black dye).

In order that those skilled in the art may better understand the present invention and the manner in which it may be practiced, the following specific examples are given. All parts are by weight and all temperatures are in degrees centigrade unless otherwise indicated.

*Example 1*

A representative wettable powder formulation was prepared by grinding together the following:

| | Parts |
|---|---|
| Bis(pentachloro-2,4-cyclopentadien-1-yl) | 50 |
| Oleic acid (blending and binding agent) | 5 |
| Sorbit P (alkylarylsulfonate wetting agent) | 2.5 |
| Phenothiazine (stabilizer) | 5 |
| Benax (arylether sulfonate wetting agent) | 2.5 |
| Marasperse (ligninsulfonate dispersant) | 5 |
| Microcel E (synthetic silicate carrier) | 30 |

Instead of 5 parts of phenothiazine, as little as 0.05 part or as much as 12.5 parts thereof are employed in the above formula to make a useful stabilized pesticidal powder, with corresponding variation in the degree of stability. The product is more stable and more effective against mites and other pests on plants after solar illumination, than another product from which the stabilizer has been omitted. Instead of phenothiazine, diphenylamine is employed with comparable results.

*Example 2*

A dust formulation was made by grinding and blending together the following ingredients:

| | Parts |
|---|---|
| Bis(pentachloro-2,4-cyclopentadien-1-yl) | 5 |
| Oleic acid | 0.5 |
| Phenothiazine | 0.5 |
| Pyrax ABB (pyrophyllite carrier) | 94 |

Example 3

A emulsifiable concentrate was prepared by blending the following:

| | Parts |
|---|---|
| Bis(pentachloro-2,4-cyclopentadien-1-yl) | 5 |
| Oleic acid | 0.5 |
| Phenothiazine | 0.5 |
| Emcol 300X (commercial anionic/non-ionic blended emulsifier) | 1.25 |
| Emcol 500X (commercial anionic/non-ionic blended emulsifier) | 1.67 |
| Xylene | 40 |

*Example 4.—Protective action of phenothiazine on bis(pentachloro-2,4-cyclopentadien-1-yl)*

Samples of bis(pentachloro-2,4-cyclopentadien-1-yl) formulated as a wettable powder as in Example 1 but differing in protective agent used, were suspended in water and dried to uniform deposits on glass Petri dishes. These were uniformly rotated under two ultraviolet lamps for 8 days after which they were tested for bis(pentachloro-2,4-cyclopentadien-1-yl). The plate holders were air cooled to reduce the effect of heat.

| Protectant Used (10% of toxicant weight) | Percent Loss of active Bis(pentachloro-2,4-cyclopentadien-1-yl) by infrared assay |
|---|---|
| None | 42 |
| Nigrosine (black dye) | 36 |
| Lampblack | 44 |
| Ethyl Antioxidant 702 (4,4'-methylenebis(2,6-ditert-butylphenol) | 78 |
| Methyl salicylate | 64 |
| Tenox (butylated hydroxy anisole) | 64 |
| Acetamide | 42 |
| Phenothiazine | 4 |

In a similar experiment diphenylamine was shown to exert a substantial inhibitory effect on the photochemical breakdown of bis(pentachloro-2,4-cyclopentadienyl).

In further experiments wherein the degradation (in the case of the unstabilized wettable powder) was carried to essentially complete destruction of the toxicant over a several-week period, parallel tests with a formulation containing (originally) 50 percent bis(pentachlorocyclopentadienyl) and 5 percent diphenylamine showed substantial toxicant still to be present.

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A composition comprising bis(pentachloro-2,4-cyclopentadien-1-yl) stabilized by a stabilizing proportion of at least one stabilizing compound selected from the group consisting of diphenylamine and phenothiazine.

2. A composition according to claim 1 in which the proportion of bis(pentachloro-2,4-cyclopentadien-1-yl) is from about 0.5 to about 99 percent by weight and the proportion of stabilizing compound is from 0.1 to 25 percent by weight of the bis(pentachloro-2,4-cyclopentadien-1-yl).

3. The composition of claim 1 wherein the stabilizing compound is phenothiazine.

4. The composition of claim 1 wherein the stabilizing compound is diphenylamine.

5. A composition according to claim 2, wherein the stabilizing compound is phenothiazine.

6. A pesticidal composition comprising a pesticidal concentration, from 5 to 50 parts by weight of bis(pentachloro-2,4-cyclopentadien-1-yl), a carrier therefor selected from the group consisting of liquids and finely divided solids, and a stabilizing proportion, from 0.05 to 12.5 parts by weight of phenothiazine, said stabilizing proportion of phenothiazine being effective to stabilize the bis(pentachloro-2,4-cyclopentadien - 1 - yl) pesticidal compound against photodecomposition by actinic light.

References Cited by the Examiner

UNITED STATES PATENTS

| | | | |
|---|---|---|---|
| 2,043,257 | 6/1936 | Missbach | 167—42 |
| 2,123,929 | 7/1938 | Bousquet | 167—30 |
| 2,217,566 | 10/1940 | Smith | 167—33 |
| 2,609,343 | 9/1952 | Saunders et al. | 252—47.5 |
| 2,691,632 | 10/1954 | Harle | 252—47.5 |
| 2,837,579 | 6/1958 | Buntin | 167—30 |
| 2,934,470 | 4/1960 | Rucker | 167—30 |

OTHER REFERENCES

King: "Chemicals Evaluated as Insecticides and Repellants," U.S. Dept. of Agriculture, Agriculture Handbook No. 69, May 1954, p. 155.

JULIAN S. LEVITT, *Primary Examiner.*

LEWIS GOTTS, *Examiner.*